(12) United States Patent
Shimizu et al.

(10) Patent No.: US 7,478,698 B2
(45) Date of Patent: Jan. 20, 2009

(54) ARRANGEMENT OF INTAKE AND EXHAUST SYSTEM COMPONENTS IN A FUEL CELL POWERED VEHICLE

(75) Inventors: Masahiro Shimizu, Saitama (JP); Yoshiyuki Horii, Saitama (JP); Junya Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 579 days.

(21) Appl. No.: 11/172,267

(22) Filed: Jun. 30, 2005

(65) Prior Publication Data

US 2006/0040144 A1    Feb. 23, 2006

(30) Foreign Application Priority Data

Aug. 19, 2004  (JP)  ............................. 2004-239774
Aug. 20, 2004  (JP)  ............................. 2004-241514

(51) Int. Cl.
*H01M 8/04*    (2006.01)

(52) U.S. Cl. ...................................... 180/220; 180/68.2
(58) Field of Classification Search ................. 180/219, 180/220, 229, 68.1, 68.2
See application file for complete search history.

(56) References Cited

U.S. PATENT DOCUMENTS

| | | | | |
|---|---|---|---|---|
| 6,326,765 B1 * | 12/2001 | Hughes et al. | ............... | 320/104 |
| 6,568,496 B1 * | 5/2003 | Huang | ........................ | 180/220 |
| 6,648,085 B2 * | 11/2003 | Nagura et al. | ............... | 180/65.1 |
| 6,715,571 B2 * | 4/2004 | Nakamori | ................... | 180/65.1 |
| 6,722,460 B2 * | 4/2004 | Yang et al. | ................... | 180/220 |
| 6,793,027 B1 * | 9/2004 | Yamada et al. | ............. | 180/65.1 |
| 2002/0162693 A1 * | 11/2002 | Mizuno et al. | ............. | 180/65.1 |

FOREIGN PATENT DOCUMENTS

JP    2001-216986    8/2001
JP    2001-231108    8/2001

* cited by examiner

*Primary Examiner*—Christopher P Ellis
*Assistant Examiner*—Brian Swenson
(74) *Attorney, Agent, or Firm*—Carrier, Blackman & Associates, P.C.; William D. Blackman; Joseph P. Carrier

(57) ABSTRACT

An arrangement of intake and exhaust system components in a fuel cell powered vehicle makes it easier to install those components on a vehicle body. The arrangement also improves power generating efficiency, and eases maintenance. The arrangement, which includes a fuel cell, intake system components such as an air cleaner, compressor, intercooler, and humidifier, and exhaust system components including an exhaust pipe which exhausts emission gas from the fuel cell through an exhaust port, is such that the intake system components and the exhaust system components are both located on one side of the fuel cell, for example behind the fuel cell. The air cleaner, compressor, intercooler, humidifier and fuel cell may be substantially linearly sequentially arranged, to reduce air flow resistance. The pipes between the air cleaner and the compressor, and between the intercooler and the humidifier are short.

11 Claims, 13 Drawing Sheets

ARRANGEMENT OF INTAKE AND EXHAUST SYSTEM COMPONENTS IN A FUEL CELL POWERED VEHICLE

CROSS-REFERENCE TO RELATED APPLICATIONS

The present application claims priority under 35 USC 119 based on Japanese patent application Nos. 2004-239774, filed Aug. 19, 2004, and 2004-241514, filed on Aug. 20, 2004. The subject matter of each of these priority documents is incorporated by reference herein.

BACKGROUND OF THE INVENTION

1. Field of the Invention

The present invention relates to an arrangement of fuel cell intake and exhaust system components in a fuel cell powered vehicle, where the vehicle is provided with an air cleaner for taking in and filtering ambient air, and a compressor for compressing filtered air and generating reactive gas.

2. Description of the Background Art

In recent years, fuel cell powered vehicles have been developed, in which electric power generated by a fuel cell system is supplied to a motor, and wheels of the vehicle are driven by the motor. In this fuel cell system, electric power is generated by a chemical reaction in a fuel cell stack between hydrogen, as a fuel gas, and oxygen as a reactive gas (hereinafter called simply a "fuel cell").

In this system, while the fuel gas is stored at high pressure in a fuel cylinder, reactive gas must be generated by taking in ambient air and compressing it to make it high-pressure air. In addition, it is desirable that reactive gas to be supplied to the fuel cell does not contain impurities. Therefore, a supercharging mechanism (for example, as disclosed in JP-A No. 216986/2001) may be employed, and impurities are removed from the air by an air cleaner before the air is compressed by a compressor, to generate reactive gas which is then supplied to the fuel cell.

In a conventional fuel cell powered vehicle in which a vehicle driving motor is driven by electric power supplied from a fuel cell, the fuel cell is located almost in the center of the vehicle body. The air for supply to the fuel cell is taken in through an intake port (duct) provided at the front part of the vehicle body, namely in front of the fuel cell and exhausted through an exhaust port (duct) at the rear part of the vehicle body, namely behind the fuel cell. This arrangement is disclosed in, for example, JP-A No. 231108/2001.

In the above conventional structure, intake system components such as an air cleaner and a supercharger may be positioned so as to be considerably distant from exhaust system components such as a dilution box and a muffler, with the fuel cell between them. In this arrangement, the components are difficult to install and maintain.

As mentioned above, the supercharging mechanism of the fuel cell system has an air cleaner and a compressor where the air cleaner, the compressor, and the fuel cell are connected by piping. Depending on the arrangement of these devices, the piping may have to be long or large and weighty, and also there is concern that increased air-flow resistance in the piping might deteriorate the power generating efficiency of the fuel cell system. Particularly in a fuel cell powered motorcycle, the installation space for the devices is limited and reduction in the size of the piping used in the supercharging mechanism is anticipated for space saving.

Therefore, the present invention provides an arrangement of intake and exhaust system components in a fuel cell powered vehicle which makes it easier to install the intake system components and exhaust system components of a fuel cell to a vehicle body, and improves their maintainability.

The present invention also has an object to provide a fuel cell powered vehicle in which the weight and size of a supercharging mechanism of a fuel cell system are reduced and the air-flow resistance in the supercharging mechanism is decreased to improve the power generating efficiency of the fuel cell system.

SUMMARY OF THE INVENTION

As a solution to the above problems, according to a first aspect of the invention, an improved arrangement of intake and exhaust system components in a fuel cell powered vehicle is provided. The vehicle includes a fuel cell (for example, a fuel cell 51 in an embodiment) which generates power as a result of a reaction between hydrogen and oxygen. The vehicle also includes an intake system component (for example, an air cleaner 57 in the embodiment) which has an intake port (for example, an intake port 74 in the embodiment) and supplies air taken in through the intake port to the fuel cell. The vehicle also includes an exhaust system component (for example, an exhaust pipe 77 in the embodiment) which has an exhaust port (for example, an exhaust port 76 in the embodiment) and exhausts emission gas, from the fuel cell, through the exhaust port. The invention is characterized in that the intake system component and the exhaust system component are both located on one side of the fuel cell.

In this arrangement, the intake system component and the exhaust system component are close to each other and it is thus easy to install these on the vehicle body and maintain them. It is also possible to integrate the intake and exhaust system components into a module.

In a second aspect of the invention, the intake system component and the exhaust system component are both located behind the fuel cell. In particular, the intake port is located behind the fuel cell, namely at the rear part of the vehicle body. In this arrangement, the intake system component is more unlikely to take in emission gas from a vehicle during operation in a forward direction than when the intake port is in front of the fuel cell, namely at the front part of the vehicle body. According to the second aspect of the invention, the possibility of taking in emission gas from another vehicle is minimized and desirable ambient air (oxidant gas) can be supplied to the fuel cell and the intake system component (air cleaner) requires less frequent maintenance.

In a third aspect of the invention, the intake system component and the exhaust system component are on opposed sides of a wheel (for example, a rear wheel 32 in the embodiment) such that the rear wheel lies between members of the intake system and members of the exhaust system. Thus, the intake port and the exhaust port are away from each other by a prescribed distance. In this arrangement, the possibility that emission gas exhausted from the exhaust port may get into the intake port again is minimized and desirable ambient air can be supplied to the fuel cell.

In a fourth aspect of the invention, the intake port is above the wheel. In this arrangement, the possibility that foreign matter caught by the rear wheel such as water or mud may get into the intake port is minimized.

In a fifth aspect of the present invention, a fuel cell powered vehicle, which is driven by electric power obtained by supply of reactive gas and fuel gas to a fuel cell, comprises an air cleaner which takes in ambient air and cleans it; and a compressor which compresses the air cleaned by the air cleaner to generate the reactive gas and supplies it to the fuel cell, wherein the compressor lies on a straight line connecting the air cleaner and the fuel cell.

When the air cleaner, compressor and fuel cell as constituents of the supercharging mechanism of the fuel cell system are arranged in line in the order of mention in this way, the length of piping between devices can be shortened, which contributes to reduction in weight and space saving. In addition, the air flow route is shortened and is linear so that air flow resistance is reduced and the power generating efficiency of the fuel cell system is improved.

In this case, the fuel cell is almost in the center of the vehicle body and the air cleaner is located above a rear wheel. When the air cleaner is located more rearward than the fuel cell in the center of the vehicle body in this way, it is unlikely that emission gas from a vehicle during operation in a forward direction will enter the air cleaner directly, and also when it is located above the rear wheel in this way, it is unlikely that splashed mud or the like from the rear wheel will enter the air cleaner.

Furthermore, it is desirable that an intake duct connected with the air cleaner is located above the air cleaner and opens rearward. If so, it is more unlikely that emission gas from a vehicle operating in the forward direction directly enters it. Also, since the intake duct is located above the air cleaner, splashed mud or the like from the rear wheel sometimes can scatter on the bottom surface of the air cleaner body but is unlikely to get into the intake duct.

In addition, the air cleaner is located on one side of the vehicle body, which makes it easy to carry out a maintenance job for the air cleaner.

The fuel cell powered vehicle may further include an intercooler which cools reactive gas compressed by the compressor, and a humidifier which exchanges moisture between reactive gas to be supplied to the fuel cell and used reactive gas. The air cleaner, the compressor, the intercooler, the humidifier and the fuel cell are arranged substantially in a line and sequentially, in the order of mention. This arrangement promotes space saving and shortens the air flow route and reduces the air flow resistance since the flow path is generally linear, leading to improvement in the power generating efficiency of the fuel cell system.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE INVENTION

Figure 1:
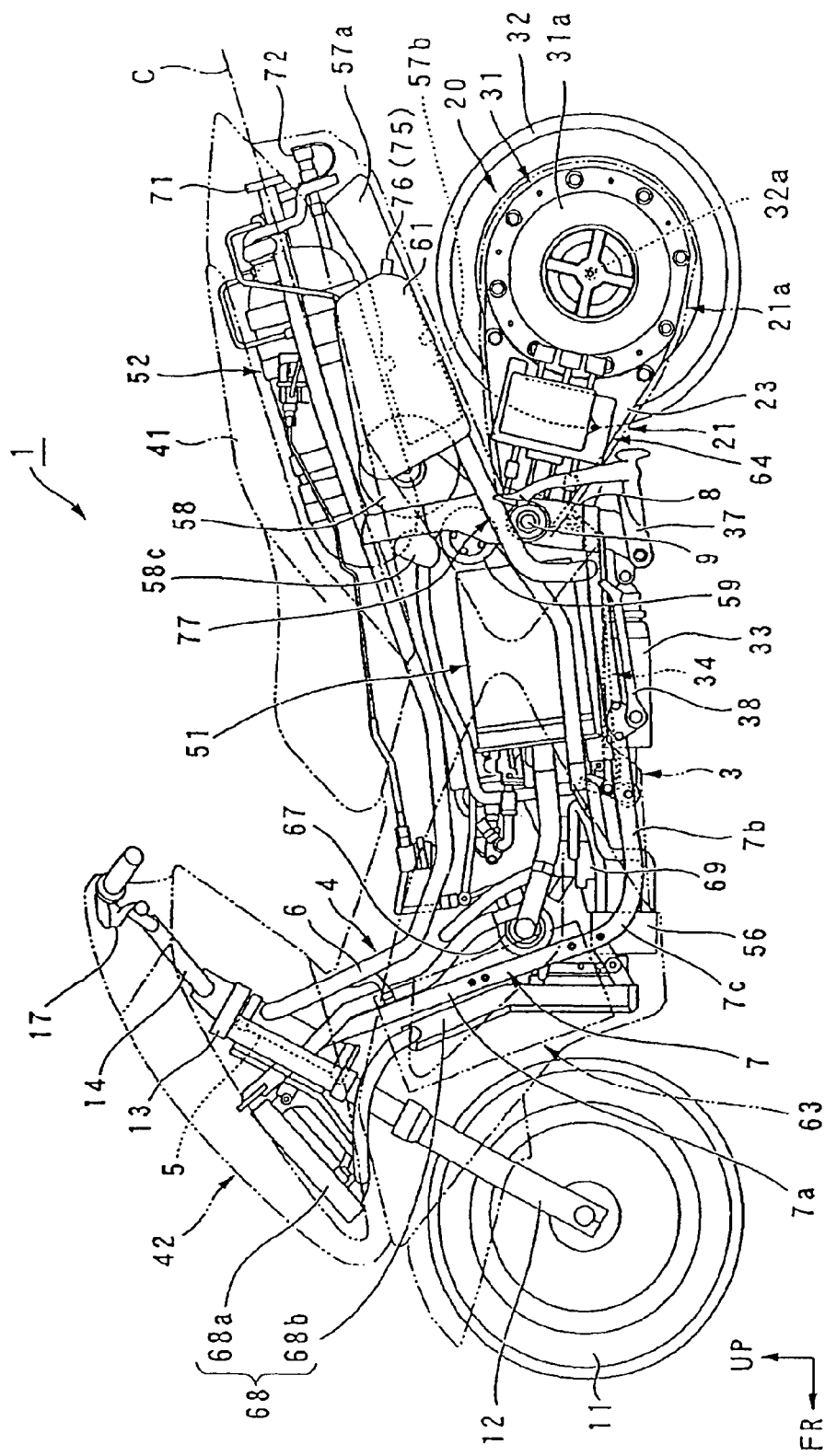
FIG. 1 is a left side view of a fuel cell powered scooter-type motorcycle according to an embodiment of the present invention.

Next, a number of selected illustrative embodiments of the present invention will be described, with reference to the drawings. In the description given below, direction-related expressions, such as front, rear, left and right, refer to those directions from the vantage point of a driver seated on the vehicle, unless otherwise specified. In the drawings, arrow FR indicates the frontal direction of the vehicle; arrow LH indicates the leftward direction of the vehicle; and arrow UP indicates the upward direction of the vehicle.

Exemplary embodiments encompassing the inventive features are shown with respect to two substantially similar scooter-type motorcycles, a first motorcycle 1 disclosed in FIGS. 1-6, and a second motorcycle 1' disclosed in FIGS. 7-13. Throughout all the figures, like reference numbers refer to like parts.

A motorcycle 1,1' as shown in FIGS. 1 to 13 constitutes a fuel cell powered vehicle which is propelled by driving a wheel via the operation of a driving motor 31, using electric power supplied from a fuel cell 51 provided almost in the center of the vehicle body. The motorcycle 1,1' is a scooter-type vehicle with a low-deck floor area 3 (hereinafter called simply the floor). The fuel cell 51 is a made in a solid rectangular box shape, and is disposed in the vicinity of the floor 3. The motor 31 is a so-called wheel-in motor, and is located inside of the rear wheel 32. The rear wheel 32 is the drive wheel for the motorcycle 1,1'. The motor 31 is an integral unit having a motor body and a reduction gear in a casing 31a, and is installed inside the wheel, for example, from the left side, with its output axis coaxial with the axle 32a of the rear wheel 32. A motor driver 64 is provided for driving the motor 31. The motor 31 and the motor driver 64 are of the water-cooled type, which features high efficiency and high output.

A front wheel 11 of the motorcycle 1,1' is pivotally supported by the lower ends of a pair of (left and right) front fork sections 12. The upper ends of the front fork sections 12 are pivotally supported on a head pipe 5 at the front end of a body frame 4 through a steering system 13 which permits steering of the vehicle. A handlebar 14 is attached to the top of the steering system 13. A throttle grip 15 is provided at the right grip part of the handlebar 14. A rear and a front brake lever 16 and 17 are provided in front of the left grip part and the right grip part, respectively, of the handlebar 14.

A pivot plate 8 extends in the vertical direction of the vehicle body and is provided at the rear part of the vehicle body frame 4. In a zone slightly below the middle of the pivot plate 8, the front end of a rear swing arm 21 is pivotally supported thereon through a pivot shaft 9 so that its rear end can swing in the vertical direction of the vehicle body. Regarding the rear swing arm 21, its left arm body 23 extends up to the front end of the motor 31, and supports the casing 31a for the motor 31 while the right arm body 24 extends to the center of the rear wheel 32 and pivotally supports the rear wheel axle 32a. A motor unit 20, as a swing unit for the motorcycle 1,1', provides a rear frame which swingably supports the rear wheel 32. The motor unit 20 includes the rear swing arm 21 and the motor 31 as its main components.

A rear shock absorber 33 extends in the front-back direction of the vehicle body below the fuel cell 51 at the bottom part of the vehicle body frame 4. The rear end of the rear shock absorber 33 is connected with the bottom of the vehicle body frame 4, and its front end is connected through a link mechanism 34 with the bottom of the motor unit 20 (rear swing arm 21). The link mechanism 34 moves the rear shock absorber 33 back and forth as the motor unit 20 swings up and down and this stroke movement of the rear shock absorber 33 absorbs impact or vibration given to the motor unit 20. Since the rear shock absorber lies below the fuel cell 51, space between the fuel cell 51 and the ground can be effectively used and the center of gravity of the fuel cell powered motorcycle 1,1' is low.

The vehicle body frame 4 has left and right upper tubes 6 and left and right down tubes 7, where the left and right upper tubes 6, originating from the top of the head pipe 5, extend obliquely downward and rearward, bend almost at the middle of the height of the vehicle body and further extend rearward. The left and right down tubes 7, originating from the bottom of the head pipe 5, extend obliquely downward and rearward and bend at the bottom of the vehicle body and further extend rearward. The rear ends of the upper tubes 6 and the rear ends of the down tubes 7 are respectively connected to the top and bottom of the pivot plate 8 located behind the fuel cell 51. Next, the down tubes 7 will be explained, where a portion from the head pipe 5 to a bend 7c at the bottom of the vehicle body is called a front edge portion 7a and a portion from the bend 7c to the pivot plate 8 is called a bottom edge portion 7b.

Each upper tube 6 extends behind the pivot plate 8 to the rear end of the vehicle body. The rear half of each upper tube 6 is used as a seat frame for supporting a rider seat 41. The front half of the seat 41 is a seat for a rider (that is, the driver) of the motorcycle 1,1', and the rear half is a seat for a co-rider (that is, a passenger).

The vehicle body of the motorcycle 1,1' is covered by a body cover 42 made mainly of synthetic resin. This body cover 42 functions as a wind shield and a part of the body cover 42, together with the vehicle body frame 4, constitutes the floor 3. At the middle of the area under the vehicle body frame 4 is a main stand 37 for supporting the vehicle body in an upright position. On the left side of the area under the vehicle body frame 4 is a side stand 38 for supporting the vehicle body in an inclined leftward standing position.

The fuel cell 51 is located almost in the center of the vehicle body, in the rear part of a zone demarcated by the upper tubes 6, lower tubes 7, and pivot plate 8. The fuel cell 51 is slightly inclined upward toward the rear of the vehicle. The fuel cell 51 is relatively large in weight in comparison with other parts of the fuel cell powered motorcycle 1,1', and since it is located almost in the center of the vehicle body, a good weight balance in the fuel cell powered motorcycle 1,1' is obtained.

The fuel cell powered motorcycle 1,1' includes the following components for a fuel cell system for power generation in the fuel cell 51: a fuel cylinder 52 which stores, at high pressure, fuel gas to be supplied to the fuel cell 51; an intake duct, or resonator, 73 which has a function of reducing the suction sound from an intake port 74 which opens rearward; and an air cleaner 57 which takes in ambient air through the intake duct (resonator) 73. Located above and before the intake duct (resonator) 73, the intake port 74 gradually bends almost 90 degrees and opens rearward.

The fuel cell powered motorcycle 1,1' further includes: a supercharger 58 (also called a compressor, pump or charger) which compresses the air cleaned by the air cleaner 57 to generate reactive gas; an intercooler 58a which cools the reactive gas compressed by the compressor 58; a humidifier 59 which exchanges moisture between reactive gas to be supplied to the fuel cell 51 and used reactive gas exhausted from the fuel cell 51; a back pressure valve 58c which is provided at the exhaust side of the humidifier 60 in order to regulate the pressure inside the fuel cell 51; a dilution box 56 which dilutes used reactive gas with used oxygen gas; and a muffler 66 which muffles the sound of diluted reactive gas which is exhausted as emission gas to the atmosphere. In this fuel cell system, the intake duct (resonator) 73, air cleaner 57, supercharger 58, intercooler 58a and humidifier 59 may be categorized as constituting a supercharging mechanism 100 (see FIG. 13) for supply of reactive gas to the fuel cell 51. The dilution box 56 is located below the fuel cell 51. Hence, exhaust (water) from the fuel cell 51 is efficiently collected into the dilution box 56.

The fuel cell powered motorcycle 1,1' has a secondary battery (not shown) as an auxiliary power supply for the fuel cell system. In this case, the secondary battery is located near the front fork.

Figure 4:
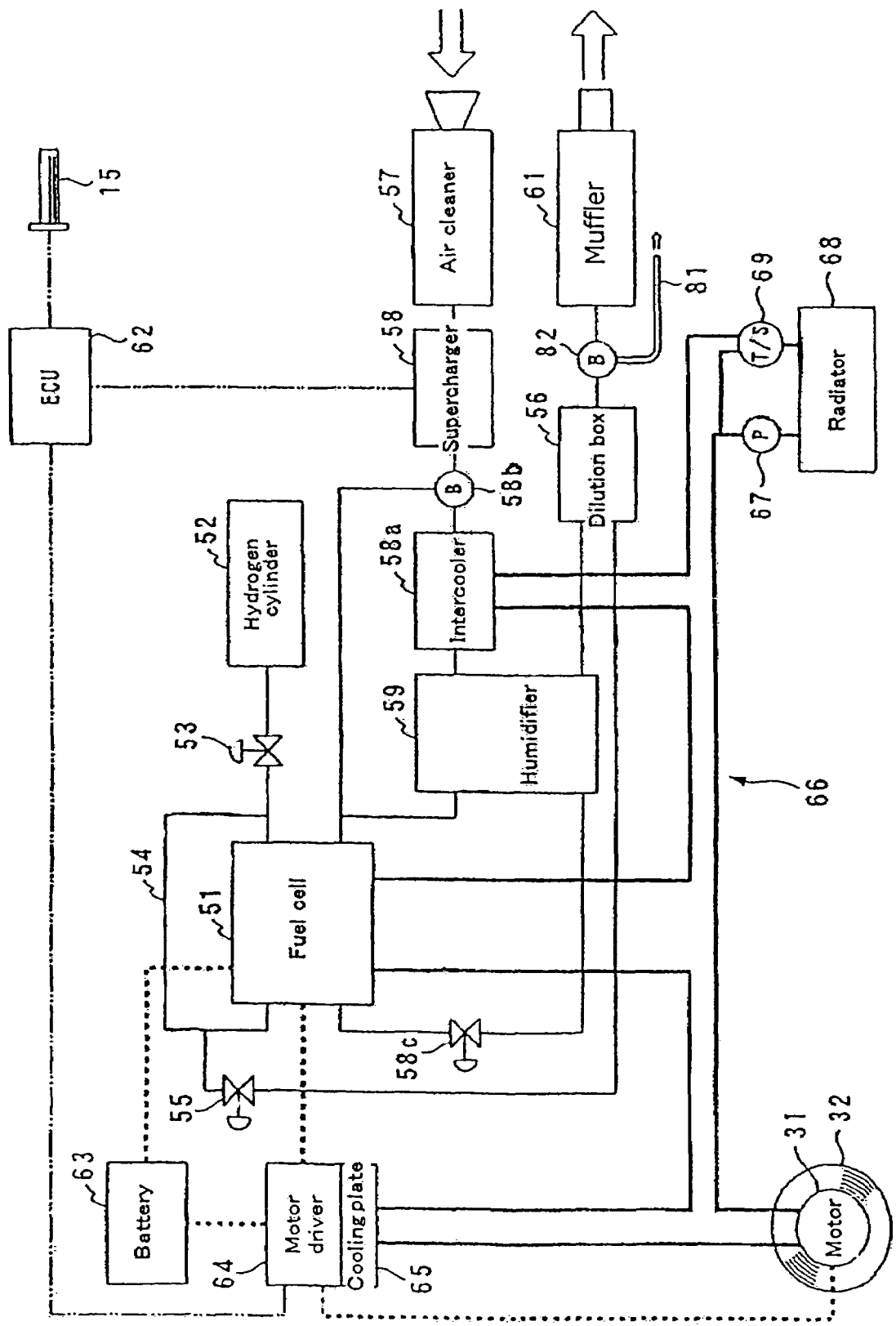
FIG. 4 is a schematic diagram of the structure of the fuel cell system of the above fuel cell powered vehicle.

The fuel cell system of the motorcycle 1,1' will now be outlined referring to FIG. 4. The fuel cell 51 is a known polymer electrolyte fuel cell (PEMFC—Proton Exchange Membrane Fuel Cell) which consists of many layers of unit cells. The fuel cell 51 generates electric power by an electrochemical reaction between a fuel gas supplied to an anode electrode and reactive gas supplied to a cathode electrode. The anode of the fuel cell 51 is supplied with hydrogen gas as fuel gas, and its cathode is supplied with oxygen-containing air as an oxidant gas so that power is generated by the electrochemical reaction and water is also produced.

Hydrogen gas as the fuel gas is supplied through a cutoff valve 53 from a hydrogen cylinder 52 at a prescribed pressure (in other words, the gas is compressed to a prescribed high pressure) to the fuel cell 51. After it is used for power generation, the hydrogen gas is introduced into a hydrogen circulating channel 54. In this hydrogen circulating channel 54, unreacted hydrogen gas is repeatedly supplied to the fuel cell 51 together with fresh hydrogen gas from the hydrogen cylinder 52. Hydrogen gas, which circulates in the hydrogen circulating channel 54, can be introduced into a dilution box 56 through a purge valve 55.

On the other hand, air as the oxidant gas is introduced through the air cleaner 57 into the supercharger 58, then compressed to a prescribed pressure and supplied to the fuel cell 51. After it is used for power generation, it is introduced into the dilution box 56. An intercooler 58a is provided which cools the air supplied to the fuel cell 51 (oxidant gas). Also provided are a humidifier 59 which supplies moisture to oxidant gas, a bypass valve 58b which supplies air without passing it through the intercooler 58a and humidifier 59 when the fuel cell 51 is cold, and a back pressure valve 58c which regulates the pressure of oxidant gas in the fuel cell 51.

When the purge valve 55 in the hydrogen circulating channel 54 opens, reacted hydrogen gas is introduced into the dilution box 56. The hydrogen gas accumulated in the dilution box 56 is mixed and diluted with exhaust air accumulated in the dilution box 56 from the fuel cell 51 and then discharged through a muffler 61 into the atmosphere.

The water produced in the fuel cell 51 is extracted when introduced into the humidifier 59 together with emission air, and reused as moisture to be supplied to oxidant gas. The moisture (for example, vapor) not extracted in the humidifier 59 is passed through the dilution box 56 and either discharged together with reacted gas or condensed in the dilution box 56 and discharged through a drain pipe 81. The drain pipe 81 is equipped with a control valve 82 which opens/closes the water channel at a prescribed time (for example, at regular intervals).

The operation of the fuel cell 51 is controlled by an electronic control unit (ECU) 62. Concretely, the ECU 62 receives signals concerning the pressure and temperature of hydrogen gas and oxidant gas, signals concerning vehicle speed and the rotational frequency of the supercharger 58, signals concerning the fuel cell 51 and its cooling water temperature, and so on. According to these signals, the supercharger 58, bypass valve 58b, back pressure valve 58c, purge valve 55, cutoff valve 53 and so on are controlled.

In addition, the ECU 62 receives an acceleration request signal from the throttle grip 15. The motor 31, which drives the rear wheel 32, is driven and controlled according to that signal. The motor 31 is a three-phase AC motor which is supplied with, and driven by, three-phase alternating currents into which direct current from the fuel cell 51 or battery 63 as a secondary cell has been converted by a motor driver 64 as an inverter unit.

The cooling system of the above fuel cell system constitutes a cooling water channel 66 which connects a water jacket of the fuel cell 51 and motor 31 and the water channels in the intercooler 58a and a cooling plate (cooler) 65 adjacent to the motor driver 64. The cooling water channel 66 is equipped with a water pump 67 and a radiator 68.

In this cooling system, as the water pump 67 is activated, cooling water flows/circulates in the cooling water channel 66 so that it absorbs heat from the fuel cell 51, motor 31, oxidant gas and motor driver 64 and this heat is radiated by the radiator 68. A thermostat 69 is used to circulate cooling water without passing it through the radiator 68 when the fuel cell 51 is cold.

Figure 2:
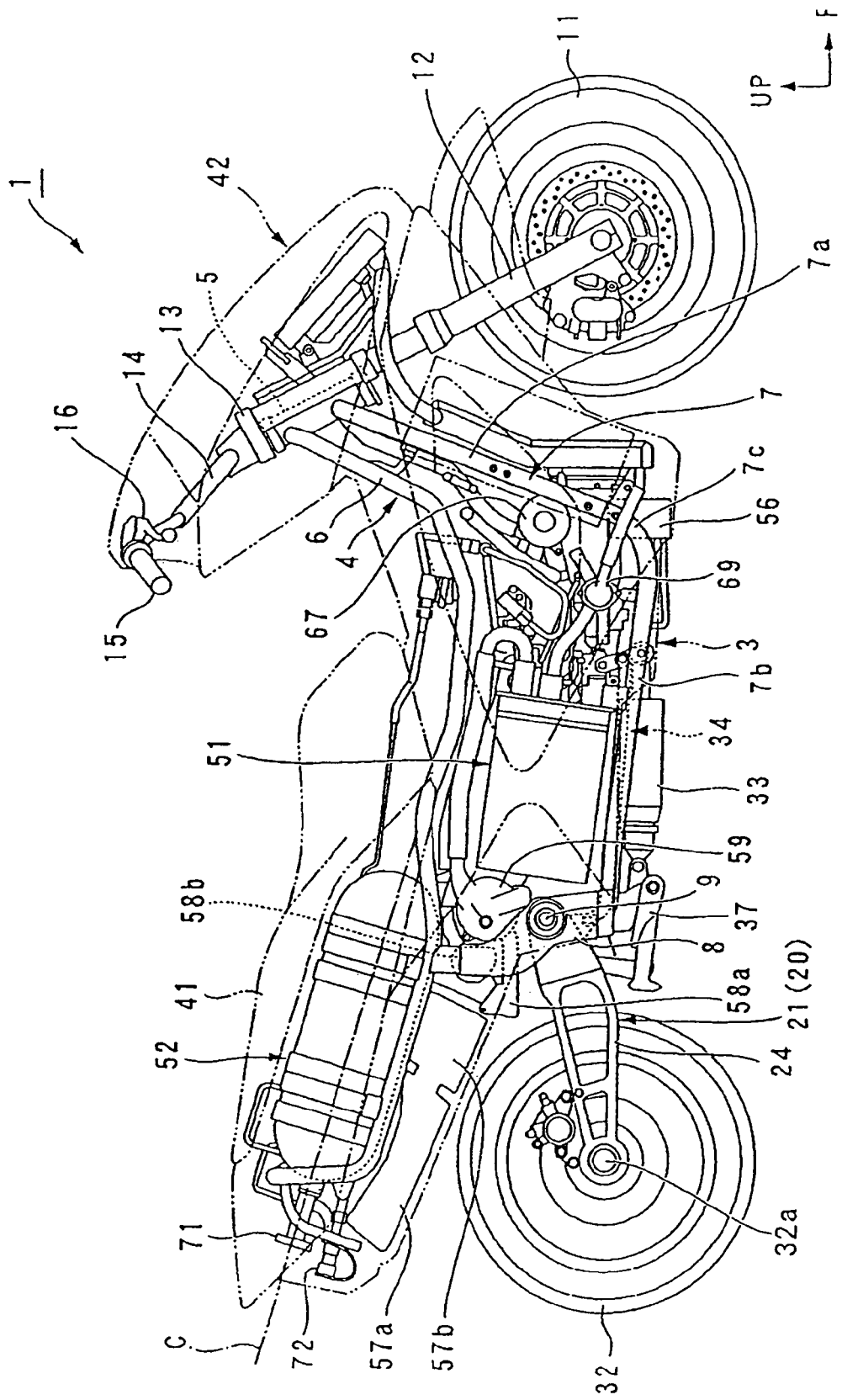
FIG. 2 is a right side view of the fuel cell powered vehicle of FIG. 1 showing the fuel cell positioned forward relative to the fuel (hydrogen) cylinder.
Figure 3:
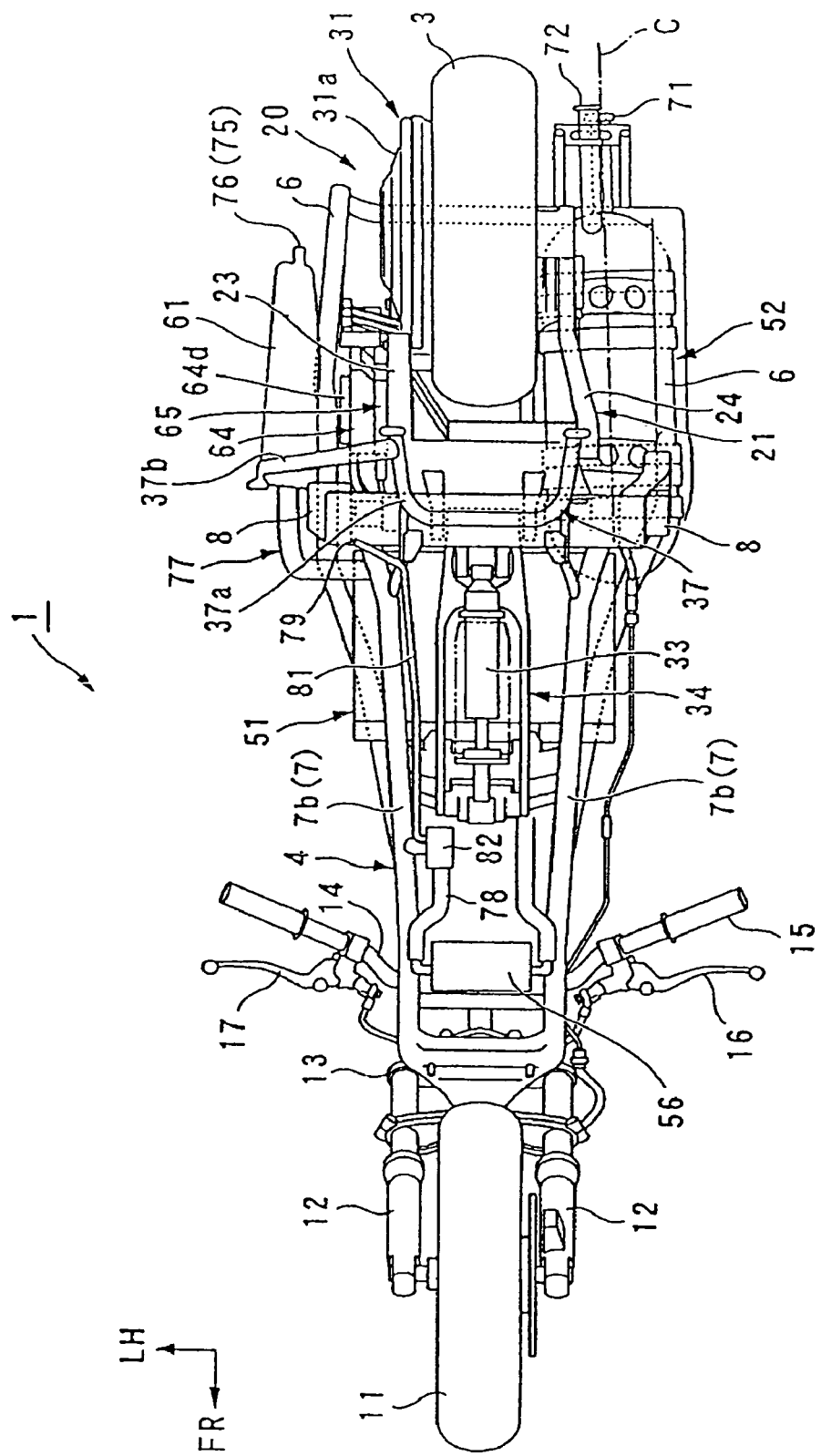
FIG. 3 is a bottom view of the fuel cell powered vehicle of FIG. 1 showing the fuel (hydrogen) cylinder positioned to the right side of the vehicle longitudinal centerline.

Referring to FIGS. 1 to 3, the fuel (hydrogen) cylinder 52 is a general compressed gas cylinder with a cylindrical appearance, and is a general composite container made of metal and fiber-reinforced plastic. The hydrogen cylinder 52 is located above a rear wheel 32 on the right side of the rear of the vehicle body with its axis line (centerline) C aligned with the front-back direction of the vehicle. More specifically, the axis line C slopes slightly down frontward. The right side (outer side) of the hydrogen cylinder 52 is slightly outside the outer side of the upper tube 6 on the right side of the vehicle body, and its left side (inner side) is slightly outside the outer right side of the rear wheel 32.

The front and rear ends of the hydrogen cylinder 52 are semispherical (in other words, tapered). The front end of the hydrogen cylinder 52 is ahead of the pivot plate 8, and the rear end is at the rear end of the vehicle body. A main cock 71 on the hydrogen cylinder 52 and a hydrogen filler hole 71 are provided at the rear end of the hydrogen cylinder 52. The fuel cylinder 52 is a relatively large part among the parts which constitute the fuel cell powered motorcycle 1,1'; however, since it lies off the centerline of the vehicle body, it minimally overlaps the rear wheel 32 when viewed from above. Thus, the space for a vertical suspension stroke of the rear wheel 32 is sufficient. This makes it easy to absorb impact from the road surface and improves the ride comfort of the fuel cell powered motorcycle 1,1'.

The upper tube 6 on the left side of the vehicle body slightly slopes upward toward the rear, and extends rearward almost linearly. At the same time, the upper tube 6 on the right side of the vehicle body gradually changes downward with respect to the upper tube 6 on the left side of the vehicle body in the vicinity of the pivot plate 8. These upper tubes 6 gradually change outward in the vehicle body width direction in the vicinity of the pivot plate 8.

When the vehicle body is viewed from the side, the lower end of the upper tube 6 on the right side of the vehicle body almost overlaps with the lower end of the hydrogen cylinder 52. The upper tube 6 bends upward at the rear end of the vehicle body and extends toward the left side of the vehicle body so as to avoid the main cock 71 and hydrogen filler hole 72 on the hydrogen cylinder 52, then bends downward to join the rear end of the upper tube 6 on the left side of the vehicle body.

The fuel cell 51 is wide in the vehicle body width direction and vertically flat. A feed port and a discharge port for oxidant gas and hydrogen gas as well as an inlet and an outlet for cooling water are provided on its front wall.

Figure 6:
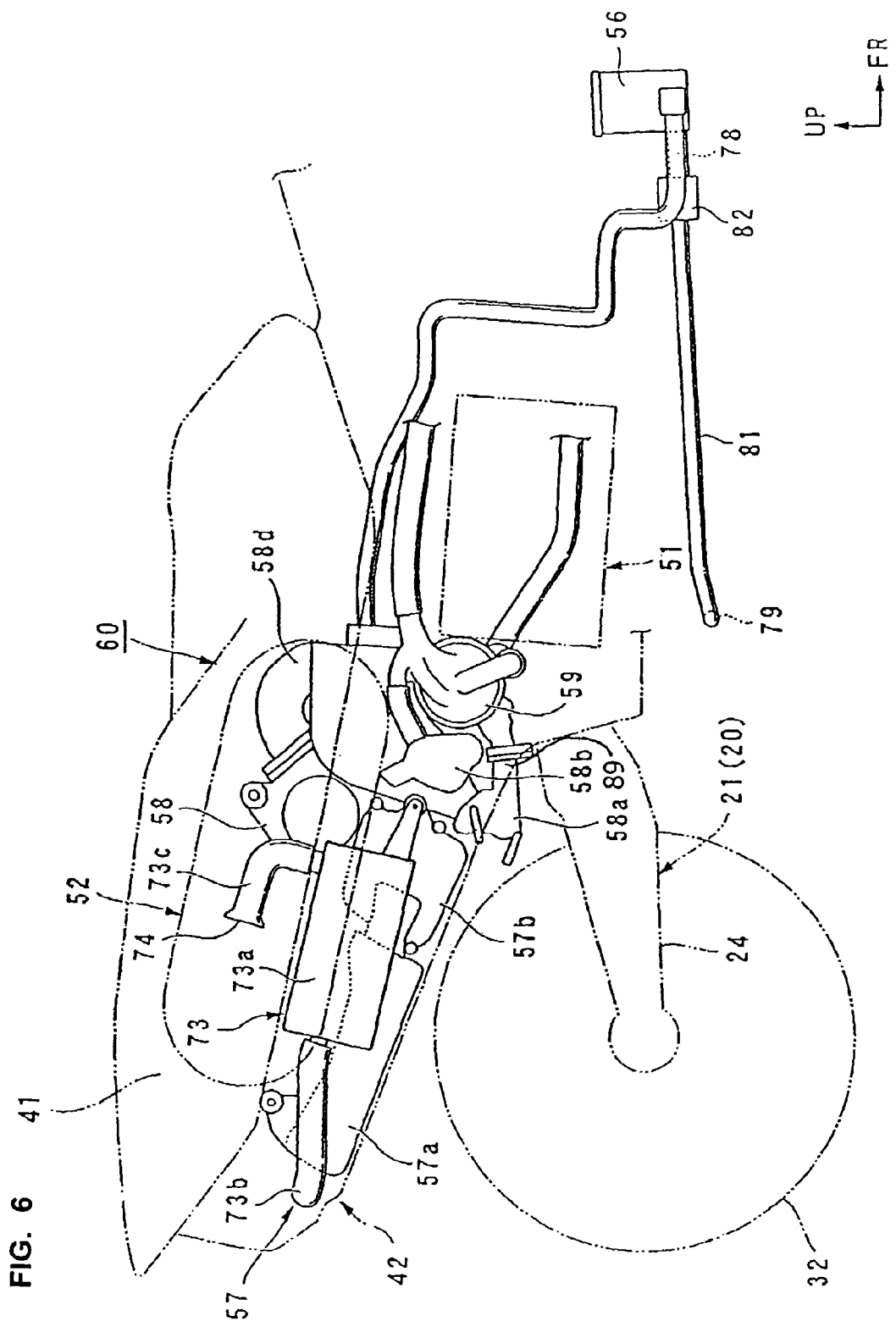
FIG. 6 is a partial isolated right side view of the rear portion of the fuel cell powered vehicle of FIG. 1 showing the intake and exhaust system components.
Figure 7:
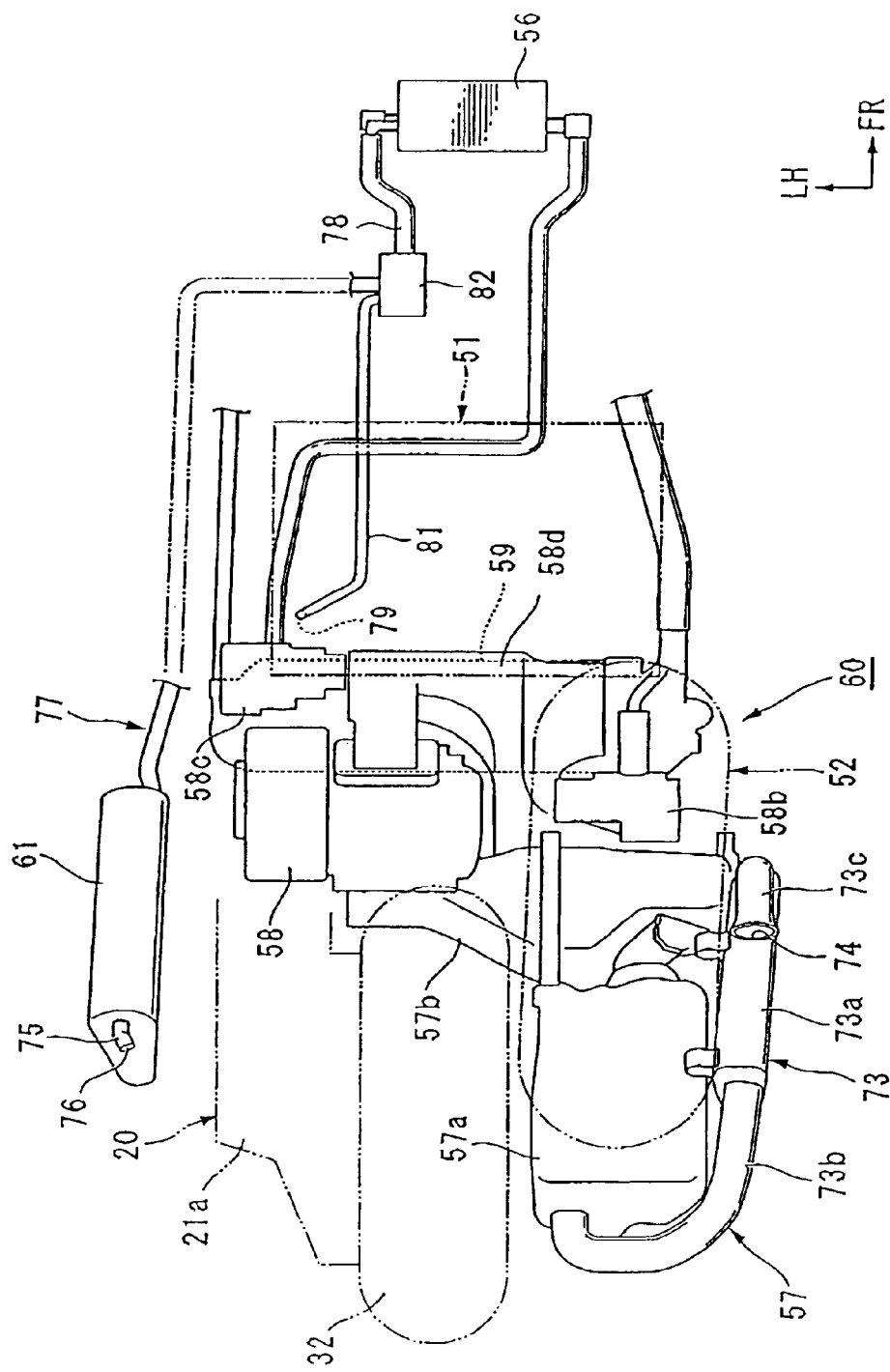
FIG. 7 is a top plan view of the of the fuel cell powered vehicle of FIG. 1 showing the intake and exhaust system components.
Figure 8:
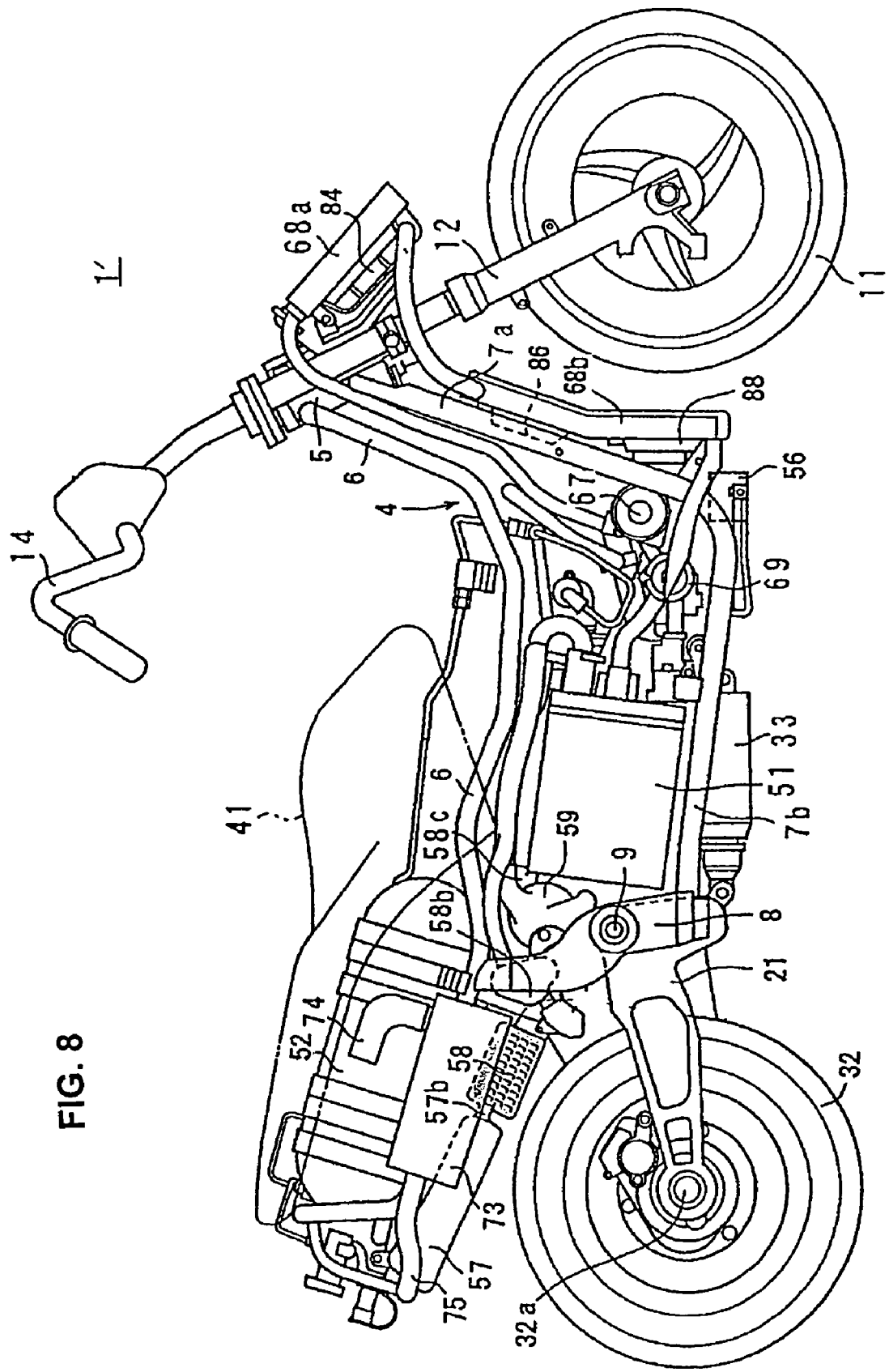
FIG. 8 is a right side plan view of a second scooter-type fuel-cell motorcycle employing the power, intake, and exhaust systems of the embodiment of FIG. 1.
Figure 9:
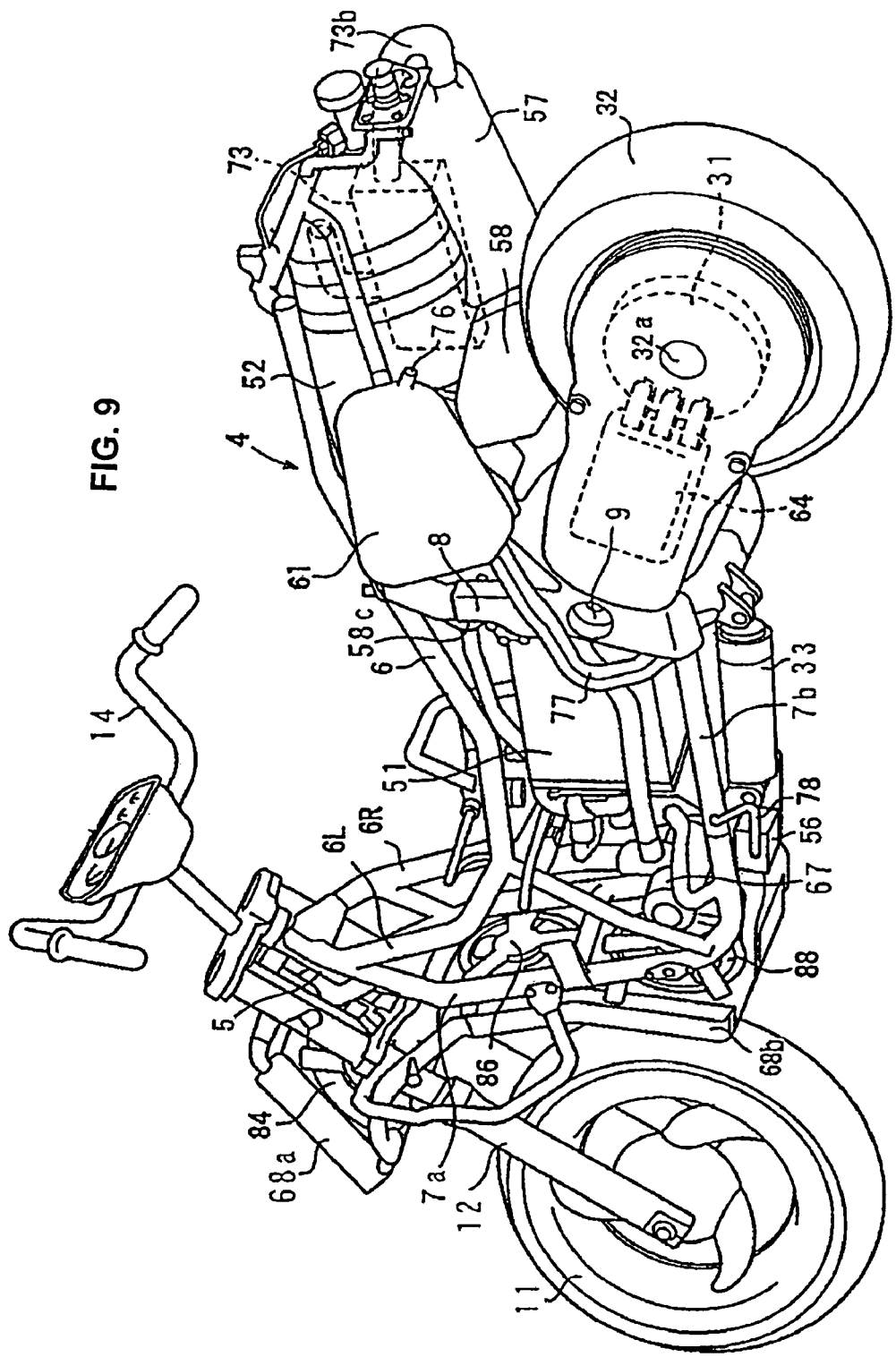
FIG. 9 is a left side perspective view of the fuel-cell motorcycle according to this embodiment as viewed from rear of the vehicle of FIG. 8.
Figure 10:
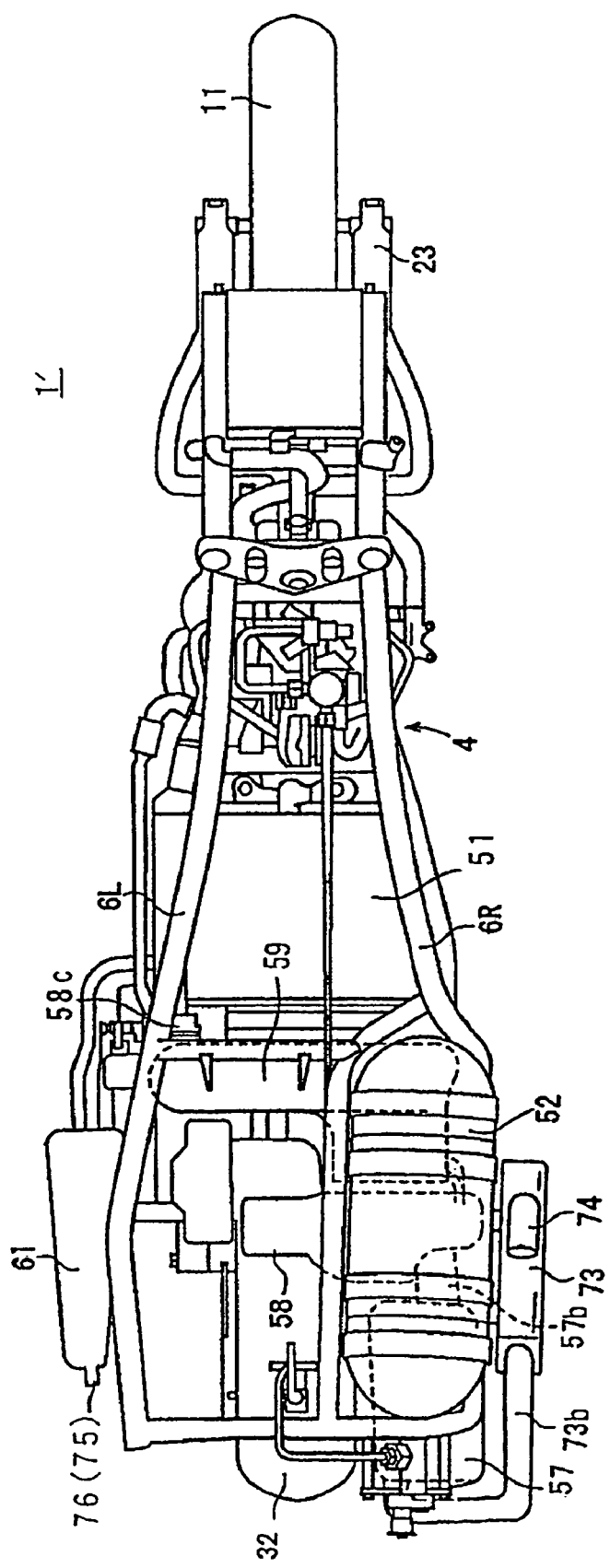
FIG. 10 is a top view of the fuel-cell motorcycle of FIG. 8 showing the air cleaner mounted to one side of the centerline of the vehicle, and the muffler mounted to the opposed side of the centerline of the vehicle.

Referring to FIGS. 6 and 7, the humidifier 59, which has a casing that is long in the vehicle body width direction, is located adjacently above and behind the fuel cell 51. The supercharger 58 is located adjacently in an oblique upward direction behind and on the left side of the humidifier 59. The left side of an inlet duct 57b, extending in the vehicle body width direction, is connected in an oblique downward direction behind the humidifier 58. The back pressure valve 58c is located adjacently on the left side of, and above, the humidifier 58.

The right side of the inlet duct 57b is located below the hydrogen cylinder 52 and its right side is connected with the front end of an air cleaner case 57a located similarly below the hydrogen cylinder 52. An intake duct 73 is connected with the rear end of the air cleaner case 57a. The air cleaner 57 is mainly composed of the intake duct 73, air cleaner case 57a and inlet duct 57b.

The intake duct 73 is located adjacent to the right side of the air cleaner case 57a and the inlet duct 57b, and extends along the side of them in the front-rear direction. The intake duct 73 has a duct body 73a which is a chamber that is almost square, and flat in the vehicle body width direction. A resin connect tube 73b extends from the rear end of the duct body 73a rearward and bends to be connected to the rear end of the air cleaner case 57a. The intake duct 73 also has an intake nozzle 73c which extends upward from the front of the top of the duct body 73a and then bends rearward. The intake nozzle 73c forms a funnel-like intake port 74 which opens rearward, above the rear wheel 32. The intake port 74 is surrounded by the seat 41 and the vehicle body cover 42 to prevent foreign matter such as water or mud from entering therein.

The air cleaner 57, somewhat flat, is located below the rear part of the fuel (hydrogen) cylinder 52, with its rear part inclined upward. The air which has passed through the air cleaner 57 is led through the short resin inlet duct 57b into the right end part of the supercharger 58. The supercharger 58 extends along the width of the vehicle body with its right end part below the center of the fuel cylinder 51. The humidifier 59 is lengthwise along the width of the vehicle body and lies between the supercharger 58 and the fuel cell 51.

The intercooler 58*a* is located below the front part of the fuel cylinder 51 and its air inlet and air outlet are connected with the supercharger 58 and the humidifier 59 respectively. As mentioned above, the intercooler 58*a* cools the air compressed by the supercharger 58 and supplies the cooled air to the humidifier 59. However, when the motorcycle 1,1' is started in a cold climate, the bypass valve 58*b* may be used to supply compressed air to the fuel cell 51 without passing it through the intercooler 58*a* and humidifier 59.

The bypass valve 58*b* is located adjacent to the right side of, and behind, the humidifier 59. The intercooler 58*a* is located adjacently in an oblique direction below and behind the bypass valve 58*b*. The bypass valve 58*b* and the intercooler 58*a* lie between the right side of the humidifier 59 and the right side of the inlet duct 57*b* in the vehicle body front-rear direction. A blowout opening located on an oblique upper front part of the supercharger 58 is connected with one end of the outlet duct 58*d*. The other end of the outlet duct 58*d* curves around the front end of the hydrogen cylinder 52 and extends rightward to join the inlet of the intercooler 58*a*.

A muffler 61, and flat in the vehicle body width direction, lies outward in the vehicle body width direction, that is, left of the vehicle centerline, relative to the upper tube 6 on the left side of the vehicle body. The muffler 61 is almost square when the vehicle body is viewed from the side, and is located so as to be inclined upward toward the rear in an oblique direction on the left side of and above the rear wheel 32. The muffler 61 is provided on the rear half of an exhaust pipe 77, which is inclined up rearward. At the rear end of the muffler 61 (exhaust pipe 77) there is a tail pipe 75 protruding rearward. An exhaust port 76 for reacted gas is provided at the rear end of the tail pipe 75. The exhaust port 76 is located slightly rearward of the rear wheel axle 32*a*.

Figure 11:
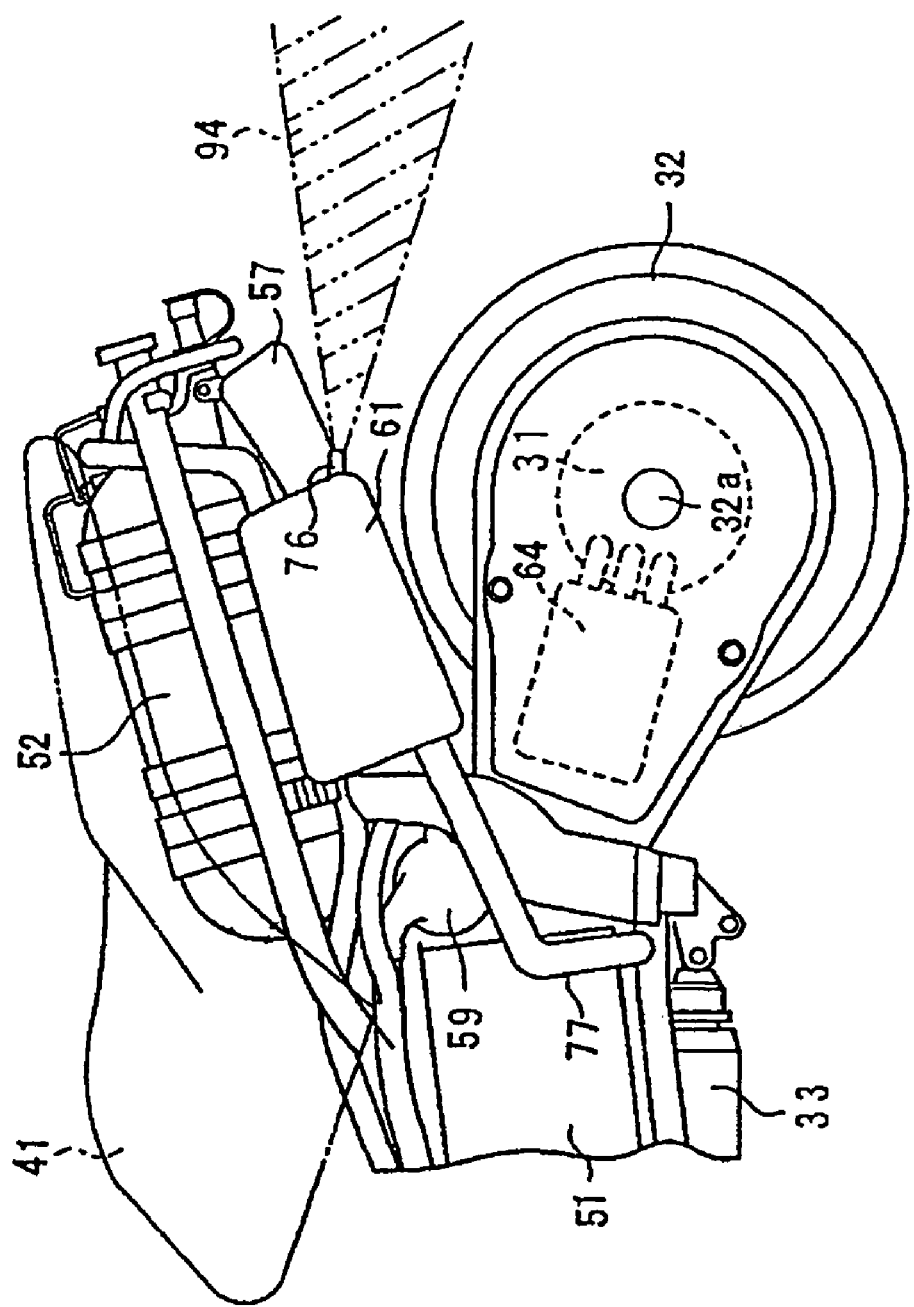
FIG. 11 is an isolated left side view of the left rear part of the fuel-cell motorcycle of FIG. 8 showing a zone representing the dispersion range of flow of emission gas from the exhaust port as dispersed by the air stream produced by forward operation of the motorcycle.

Since the exhaust port 76 is in a higher position than the rear wheel 32 and more rearward than the axle 32*a* in the front-rear direction of the vehicle, emission gas from the exhaust port 76 is dispersed by the air stream produced by driving of the motorcycle 1,1' backward into a hatched zone 94 as indicated by alternate long and two short dashes line in FIG. 11. Therefore, water vapor (or moisture) in the emission gas never drops on the rear wheel 32. Even when the fuel cell powered motorcycle 1,1' turns with a small radius, water vapor disperses backward obliquely and never drops on the rear wheel 32.

The muffler 61 (exhaust pipe 77) is located on the left of the rear wheel 32 while the air cleaner 57 is located on the right of the rear wheel 32. The muffler 61 and air cleaner 57 are both behind the fuel cell 51. As described above, at the rear of the vehicle body, the muffler 61 and the air cleaner 57 are on the left and right sides of the rear wheel 32, or with the rear wheel 32 between them. As a result, the exhaust port 76 and intake port 74 are away from each other by a prescribed distance and the intake port 74 is above the rear wheel 32 by a prescribed amount.

Intake system components such as the air cleaner 57, supercharger 58, bypass valve 58*b*, intercooler 58*a* and humidifier 59, and exhaust system components such as the back pressure valve 58*c* and muffler 61 (exhaust pipe 77) are located adjacent to each other behind the fuel cell 51, namely at the rear of the vehicle body. These intake and exhaust system components are connected integrally through connecting stays (not shown) or the like, thus constituting an intake/exhaust system module 60.

Figure 12:
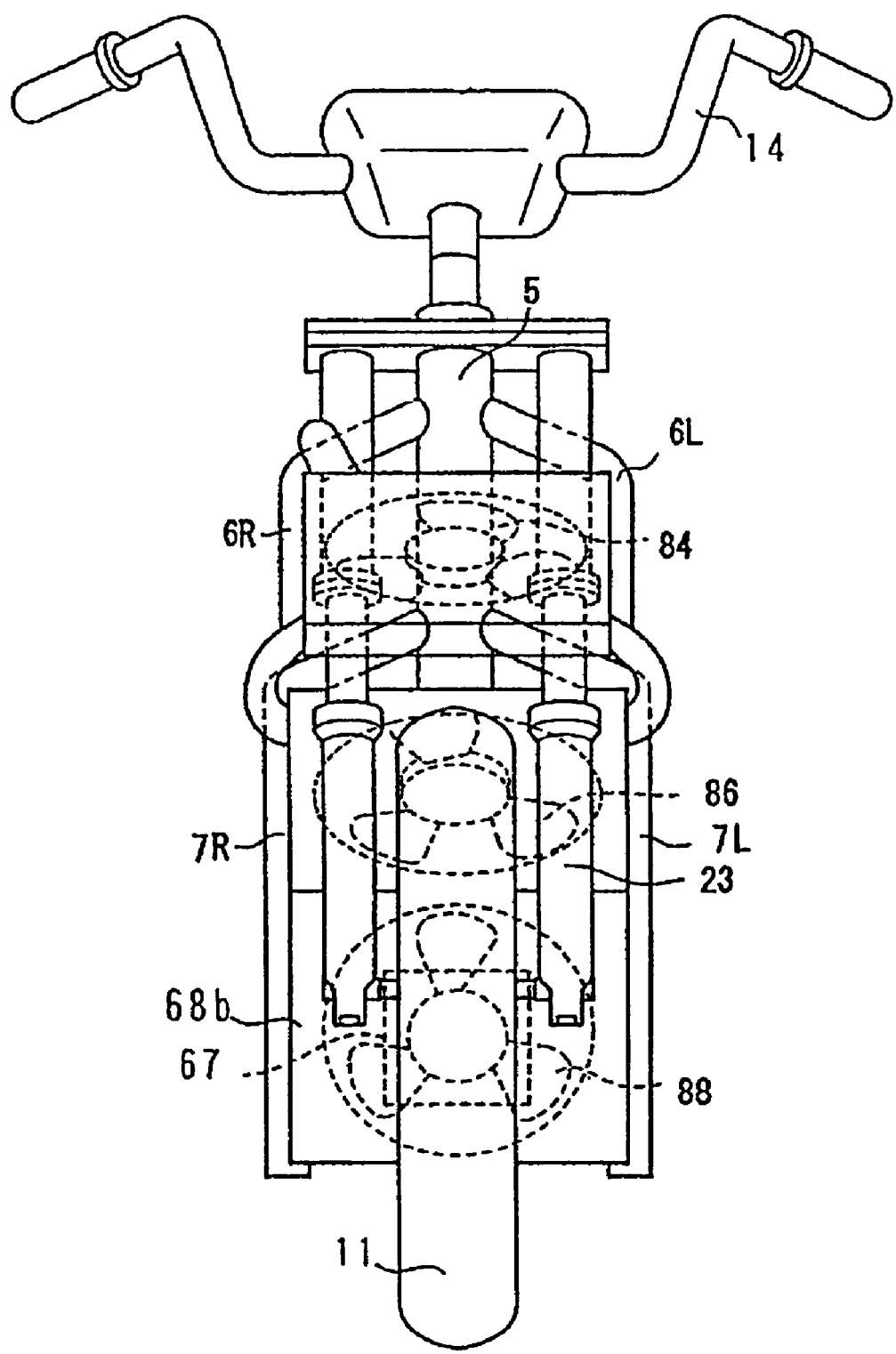
FIG. 12 is a front view of the fuel-cell motorcycle of FIG. 8 showing the locations of fans corresponding to the upper and lower radiators.
Figure 13:
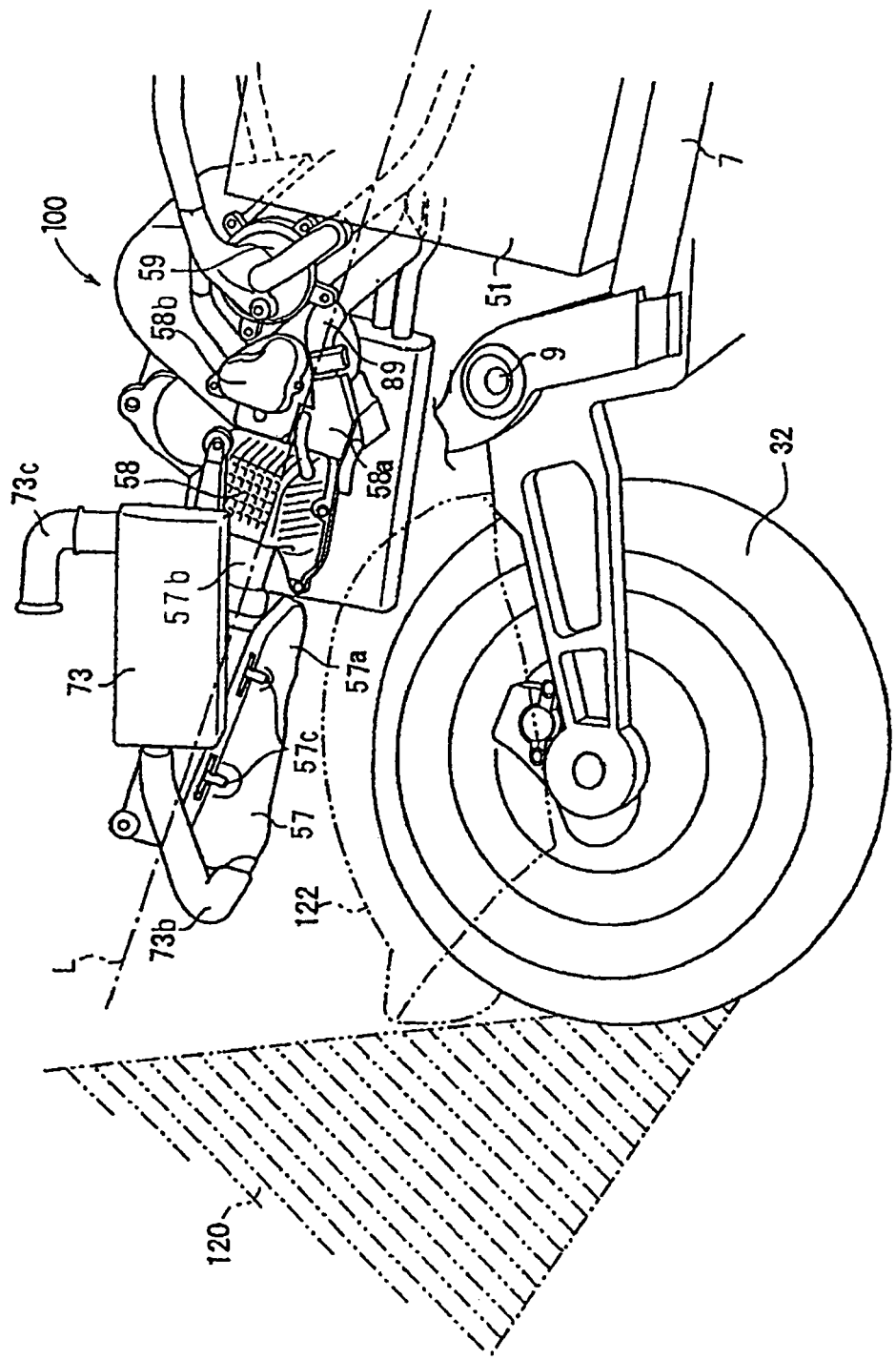
FIG. 13 is a perspective view of the supercharging mechanism in the fuel-cell motorcycle according to FIG. 8 as viewed from the right lower part showing a predicted dispersion zone for mud and water associated with rotation of the rear wheel.

As shown in FIG. 12, the first radiator 68*a* is almost square and plate-like and located on the front of the head pipe 5 and a cooling fan 84 is located on the back of the first radiator 68*a*. The second radiator 68*b* is almost twice as large as the first radiator 68*a* in height and area, and is located just before the front edge part 7*a* of down tubes, along these tubes. A cooling fan 86 is located on the back of the upper part of the second radiator 68*b*, and a cooling fan 88 is located on the back of its lower part. An electric water pump 67 is located between the cooling fan 88 and the fuel cell 51.

Since the first radiator 68*a* and second radiator 68*b* do not overlap in the length direction of the vehicle body when viewed frontally, they are easily exposed to an air stream produced by driving of the motorcycle 1,1' so that the cooling water passing through the radiators radiates heat and cools down. The cooling fans 84, 86 and 88 take in air from the first radiator 68*a* and the second radiator 68*b* and send it rearward so as to promote ventilation for the cooling fins of the first radiator 68*a* and the second radiator 68*b* and cool the cooling water more effectively.

The water pump 67 is located on the right side of and behind the lower radiator 68*b*. A thermostat 69 is located in an oblique direction below and behind the water pump 67. Also, a battery 63, flat in the vehicle body width direction, is provided inside each of the vehicle body covers 42 on both sides of the lower radiator 68*b*.

The dilution box 56 is provided between the bends 7*c* of the down tubes 7 so as to protrude downwardly beyond the lower end of the bottom edge portion 7*b*. A short exhaust pipe 78 extends from the dilution box 56 and is connected with the front of the bottom edge portion 7*b* of the down tube 7 on the left side of the vehicle body. The above-described exhaust pipe 77 comes from behind the bottom edge portion 7*b*. The down tube 7 on the left side of the vehicle body constitutes part of the discharge channel for reacted gas, so emission gas from the dilution box 56 passes through the short exhaust pipe 78 and the bottom edge portion 7*b* of the down tube 7 and the exhaust pipe 77 and is released to the atmosphere.

A drain pipe 81 diverges from the middle of the short exhaust pipe 78 through the control valve 82. The drain pipe 81 extends rearward along the bottom edge portion 7*b* of the down tube 7 on the left side of the vehicle body. For example, the control valve 82 is normally closed to close the water channel of the drain pipe 81 and allow only emission gas to pass through it. However at a prescribed time, it opens for a given time period and allows emission gas to pass through it and also allows water accumulated in the dilution box 56 to exit from the vehicle through the drain pipe 81.

Figure 5:
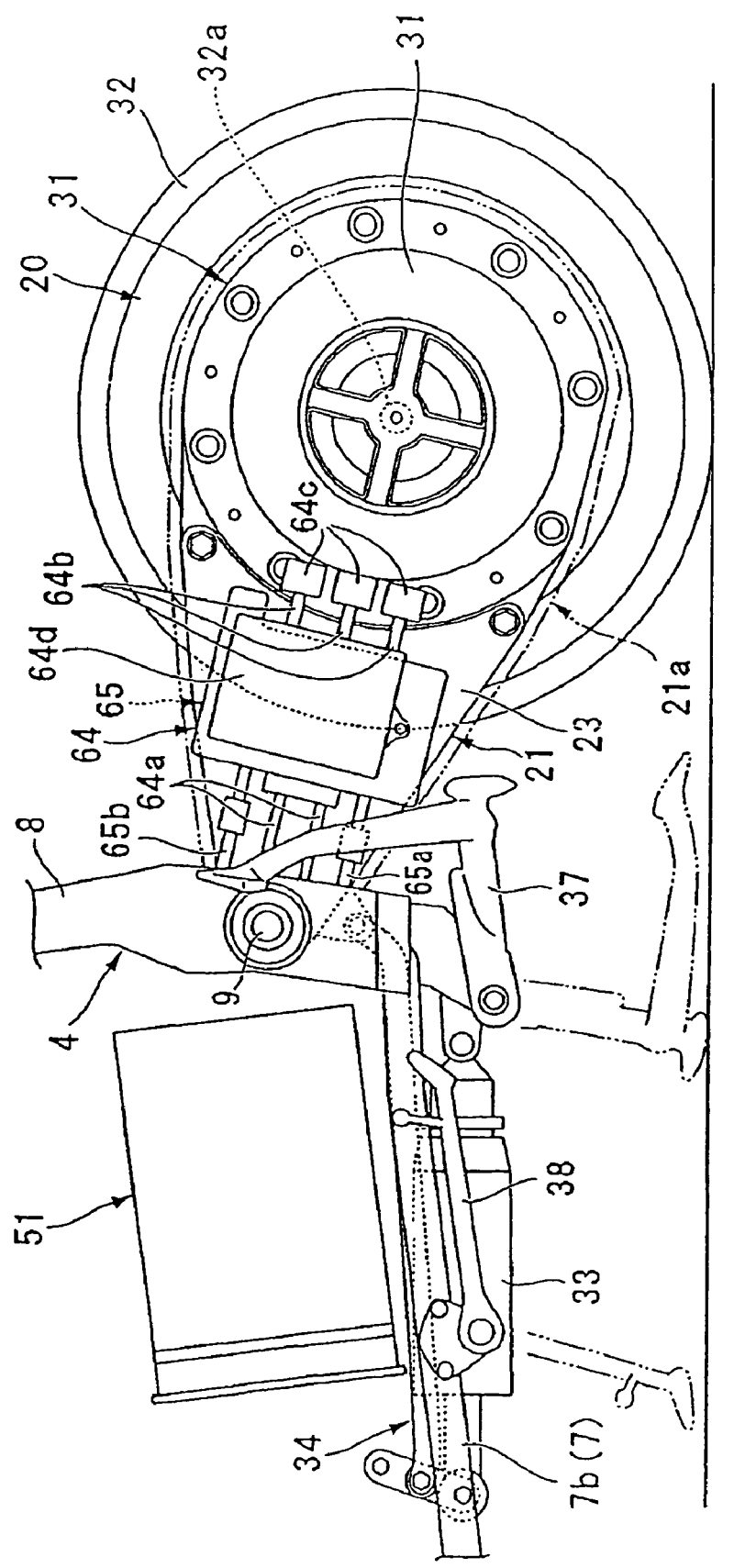
FIG. 5 is an isolated left side view of the rear portion of the fuel cell powered vehicle of FIG. 1 showing the motor driver connected to the drive motor.

Referring to FIG. 5, the motor driver 64 is almost square when the vehicle body is viewed from the side. The motor driver 64 is attached through the cooling plate 65 outside the left arm body 23 of the rear swing arm 21 in the vehicle body width direction. High-voltage wires 64*a* for supplying power from the fuel cell 51 and battery 63 are connected to the front end of the motor driver 64. A water feed pipe 65*a* and a water drain pipe 65*b*, constituents of the cooling water channel 66, are respectively connected with the bottom and top of the front end of the cooling plate 65.

Three-phase high-voltage wires 64*b* are derived from the rear end of the motor driver 64. The high-voltage wires 64*b* are of different phases and are connected to feeder terminals on the front end of the motor 31 just behind the motor driver 64. In other words, the motor driver 64 is close to the motor 31 though the components do not overlap when the vehicle body is viewed from the side. In the figure, numeral 64*c* represents current sensors on the high-voltage wires 64*b* of different phases which detect the amount of electricity supplied to the motor 31; and numeral 64*d* represents a voltage smoothening capacitor as a part of the motor driver 64.

An arm cover 21*a* as part of the rear swing arm 21 is attached to the motor unit 20. The arm cover 21*a* covers and adequately protects not only the rear swing arm 21 and the motor 31 but also the motor driver 64, cooling plate 65, voltage smoothening capacitor 64*d*, high-voltage wires 64*a* and 64*b*, water feed pipe 65*a*, water drain pipe 65*b*, current sensors 64*c* and so on. An air intake port and an air exhaust port (not shown) which enable ambient air to be introduced and circulated inside are provided on the arm cover 21*a*.

As explained so far, the arrangement of intake and exhaust system components of the fuel cell powered vehicle (motorcycle 1,1') in the above embodiment is such that the fuel cell 51 for generating power by reaction between hydrogen and oxygen, intake system components such as the air cleaner 57 for supplying the air taken in through the intake port 74 to the fuel cell 51, and exhaust system components such as the exhaust pipe 77 for exhausting emission gas through the exhaust port 76 are provided. Moreover, the intake system components and the exhaust system components are all located on one side, for example the rear side, of the fuel cell 51.

According to this constitution, the intake system components and the exhaust system components are close to each other, which makes it easy to install them on the vehicle body and maintain them. It is also possible to integrate the intake and exhaust system components into a module.

In the fuel cell powered motorcycle 1,1' structured as mentioned above, the intake duct (resonator) 73, air cleaner 57, supercharger 58, intercooler 58*a* and humidifier 59, which constitute the supercharging mechanism 100 of the fuel cell system are all located above the rear wheel 32.

When viewed from the right side of the vehicle, the air cleaner 57, supercharger 58, intercooler 58*a*, humidifier 59 and fuel cell 51 are arranged compactly and sequentially from the rear to front of the vehicle in the order of mention generally along a virtual line L gradually sloping down toward the front. Since the air cleaner 57, supercharger 58, intercooler 58*a* and humidifier 59 are arranged in line, the rear part of the fuel cell powered motorcycle 1,1' is narrow in width, and a co-rider on the pillion of the seat 41 can easily sit thereon. The supercharger 58, intercooler 58*a* and humidifier 59 are larger in weight than the intake duct (resonator) 73 and air cleaner 57. Since these heavier devices are located closer to the center of the vehicle body than the lighter devices, that is intake duct (resonator) 73 and air cleaner 57, a good weight balance is achieved and driving performance is improved.

The distance between the air cleaner 57 and the supercharger 58 and the distance between the intercooler 58*a* and the humidifier 59 are very short and the resin inlet ducts 57*b* and 89, which connect these devices, are short. Also, the supercharger 58 and the intercooler 58*a* are contiguous with each other and can be directly connected by a prescribed flange.

In the above arrangement of intake and exhaust system components, since the intake system components and the exhaust system components are positioned rearward of the fuel cell 51, and particularly the intake port 74 is behind the fuel cell 51, namely at the rear part of the vehicle body, the air cleaner 57 is more unlikely to take in emission gas from a vehicle running ahead than when the intake port 74 is in front of the fuel cell 51, namely at the front part of the vehicle body. Therefore, desirable ambient air (oxidant gas) can be supplied to the fuel cell 51 and maintenance of the air cleaner 57 is required less frequently.

In the above arrangement of intake and exhaust system components, the intake system components and the exhaust system components are on opposed sides of the rear wheel 32 with the rear wheel 32 between them. Thus the intake port 74 and the exhaust port 76 spaced apart from each other by a prescribed distance, the possibility of emission gas from the exhaust port 76 getting into the intake port 74 again is minimized, and desirable ambient air is supplied to the fuel cell 51.

Also, in the above arrangement of intake and exhaust system components, since the intake port 74 is located above the rear wheel 32, the possibility that foreign matter caught by the rear wheel 32 such as water or mud may get into the intake port 74 is minimized, and the maintenance of the air cleaner 57 is required less frequently.

As described above, the inlet ducts 57*b* and 89 for connection of constituent devices of the supercharging mechanism 100 are short or for connection between some constituent devices, no connection pipe is needed, leading to weight reduction and space saving. In addition, since the air flow route is short and linear, the air-flow resistance is reduced and the power generating efficiency of the fuel cell system is improved.

Since the air cleaner 57 is located relatively rearward in the fuel cell powered motorcycle 1,1', emission gas from a vehicle running ahead the motorcycle is intercepted by the seat 41, frame 4, cowling 42 or the like, which prevents emission gas from getting into the air cleaner 57 directly. Particularly, since the intake duct 74 opens rearward, it takes in minimal emission gas coming from ahead.

In addition, the air cleaner 57 and the intake duct 74 are located above the rear wheel 32, an arrangement which prevents splashes (mud or the like) from the rear wheel 32 from entering into them. In other words, splashed mud or the like tend to go backward and in the back upward direction, or into a hatched zone 120 indicated by alternate long and two short dashes line in FIG. 13 and thus avoid contact with the air cleaner 57 and the intake duct 74. Particularly, the intake duct 75 is located forward of the rear wheel axle 32*a* in the length direction of the vehicle body, which more effectively prevents splashed mud from getting entering therein.

Since the intake duct 74 is located above the intake duct (resonator) 73, the bottom of the air cleaner 57 or the bottom of the intake duct (resonator) 73 may be splashed with mud or the like from the rear wheel 32 but such splashes cannot get into the intake duct 74. When the intake duct 74 is located above the air cleaner 57, the same effect is also achieved.

When a mud guard cover 122 is attached to the rear wheel 32, the effect of preventing mud from getting into the air cleaner 57 and the intake duct 74 is further enhanced.

As explained above, since the motorcycle 1,1' is structured to prevent the air cleaner 57 and the intake duct 74 from taking in emission gas from a vehicle running ahead or splashed mud or the like from the rear wheel 32, the filter of the air cleaner 57 rarely gets clogged and the frequency of required maintenance is low.

Since the air cleaner 57 is located on the right side of the vehicle body, it can be easily visually checked and touched with the cowling removed, which makes it easy to carry out maintenance such as filter replacement. Concretely, it is easy to put a tool on a bolt 57*d* fixing the air cleaner case 57*a* of the air cleaner 57, which eliminates the need for a special tool.

Also, a person who carries out the maintenance job can, while standing in a natural position beside the vehicle body, easily pull out downward the air cleaner case 57a with the bolt 57d removed and attach or detach the filter inside.

Since the fuel cell powered motorcycle 1,1' is of the scooter type, the rider need not have the fuel tank between his/her legs like an on-road sports type motorcycle and it is desirable for the rider to be able to sit on the seat with the legs closed as far as possible. Therefore, the width of the vehicle body should be decreased in the area between the fuel cell 51 and the second radiator 68b which corresponds to where the feet rest. In the fuel cell powered motorcycle 1,1' according to this embodiment, the supercharging mechanism 100 is located on the rear part of the vehicle body at the right side, so the vehicle body width in the foot rest area can be narrowed. In addition, since the foot rest area has sufficient room, devices other than the supercharging mechanism 100, for example, the electric water pump 67 and the thermostat 69 as constituents of the cooling system for the fuel cell 51, may be positioned or oriented in an adequate manner.

The present invention is not limited to the above embodiment, but may be embodied in another form. For example, the dilution box 56 as one exhaust system component may be behind the fuel cell 51 and included in the intake and exhaust system module 60. Similarly, the locations of the intake and exhaust system components may be changed as appropriate.

The constitution according to the above embodiment is just one example and obviously the invention may be applied not only to motorcycles but also to other fields and may be modified in various forms without departing from the spirit thereof.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

What is claimed is:

1. A fuel cell powered vehicle, comprising:
   a fuel cell which is operable to generate power from a reaction between hydrogen and oxygen;
   an intake system component which has an intake port opening rearwardly and supplies air taken in through said intake port to said fuel cell; and
   an exhaust system component which has an exhaust port and exhausts emission gas from said fuel cell through said exhaust port,
   wherein said intake system component and said exhaust system component are both disposed on the same side of said fuel cell.

2. The fuel cell powered vehicle according to claim 1, wherein said intake system component and said exhaust system component are both located behind said fuel cell.

3. The fuel cell powered vehicle according to claim 1, wherein the vehicle comprises a frame and a plurality of wheels supported on the frame, and wherein said intake system component and said exhaust system component are disposed substantially on opposite sides of a wheel which is positioned therebetween.

4. The fuel cell powered vehicle according to claim 3, wherein said intake port is situated above said wheel.

5. A fuel cell powered vehicle which is operable to be driven by electric power obtained by a reaction between a reactive gas and a fuel gas in a fuel cell, the vehicle comprising:
   a fuel cell;
   an air cleaner for taking in and cleaning ambient air, wherein an intake duct connected with said air cleaner is located above said air cleaner and opens rearwardly; and
   a compressor for compressing the air cleaned by said air cleaner to generate said reactive gas, and which supplies said reactive gas to said fuel cell,
   wherein said compressor lies substantially on a straight line connecting said air cleaner and said fuel cell.

6. The fuel cell powered vehicle according to claim 5, wherein the vehicle further comprises a vehicle body, a frame and a plurality of wheels supported on the frame; wherein said fuel cell is located at a central portion of the vehicle body, and wherein said air cleaner is located above a rear wheel of said plurality of wheels.

7. The fuel cell powered vehicle according to claim 6, wherein said air cleaner is located at a side portion of the vehicle body.

8. A fuel cell powered vehicle which is operable to be driven by electric power obtained by a reaction between a reactive gas and a fuel gas in a fuel cell, the vehicle comprising:
   a fuel cell;
   an air cleaner for taking in and cleaning ambient air;
   a compressor for compressing the air cleaned by said air cleaner to generate said reactive gas, and which supplies said reactive gas to said fuel cell,
   an intercooler for cooling reactive gas compressed by said compressor; and
   a humidifier for exchanging moisture between unused reactive gas to be supplied to said fuel cell and used reactive gas,
   wherein said compressor lies substantially on a straight line connecting said air cleaner and said fuel cell; and
   wherein said air cleaner, said compressor, said intercooler, said humidifier and said fuel cell are arranged sequentially and substantially in line in the order mentioned.

9. An arrangement of intake and exhaust system components in a fuel cell powered vehicle, the vehicle comprising:
   a fuel cell which is operable to generate power from a reaction between hydrogen and oxygen;
   an intake system component comprising an intake port and which supplies air taken in through said intake port to said fuel cell,
   an air cleaner for taking in and cleaning ambient air, and
   a compressor for compressing the air cleaned by said air cleaner to generate said reactive gas and supplies it to said fuel cell,
   an intercooler for cooling reactive gas compressed by said compressor; and
   a humidifier for exchanging moisture between reactive gas to be supplied to said fuel cell and used reactive gas, and
   an exhaust system component comprising an exhaust port and which exhausts emission gas from said fuel cell through said exhaust port,
   wherein said intake system component and said exhaust system component are disposed on opposite sides of a wheel, such that the wheel is positioned therebetween;
   wherein said compressor lies along a substantially straight line connecting said air cleaner and said fuel cell;
   wherein the arrangement includes disposing both the intake system component and the exhaust system component on the vehicle behind the fuel cell, and wherein said air cleaner, said compressor, said intercooler, said humidifier and said fuel cell are arranged sequentially and substantially in line in the order mentioned.

10. The arrangement of intake and exhaust systems in a fuel cell powered vehicle according to claim 9, wherein said intake port is positioned above said wheel.

11. The arrangement of intake and exhaust systems in a fuel cell powered vehicle according to claim 9, wherein said intake system comprises an air cleaner, and wherein said intake port is positioned above both said wheel and said air cleaner such that the air cleaner is interposed between the wheel and the intake port.

* * * * *